United States Patent
Burns (10) Patent No.: US 9,084,031 B2
(45) Date of Patent: Jul. 14, 2015

(54) CONTENT LICENSE STORAGE

(75) Inventor: Quintin S. Burns, Fort Mill, SC (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 201 days.

(21) Appl. No.: 12/966,850

(22) Filed: Dec. 13, 2010

(65) Prior Publication Data

US 2012/0150812 A1    Jun. 14, 2012

(51) Int. Cl.
| | | |
|---|---|---|
| G06F 17/30 | (2006.01) | |
| H04N 21/8355 | (2011.01) | |
| H04L 9/08 | (2006.01) | |
| H04L 29/06 | (2006.01) | |
| H04N 21/4335 | (2011.01) | |
| H04N 21/4627 | (2011.01) | |

(52) U.S. Cl.
CPC ...... *H04N 21/8355* (2013.01); *G06F 17/30085* (2013.01); *H04L 9/0825* (2013.01); *H04L 63/068* (2013.01); *H04N 21/4335* (2013.01); *H04N 21/4627* (2013.01); *H04L 2209/603* (2013.01); *H04L 2463/101* (2013.01)

(58) Field of Classification Search
CPC .................. G06F 17/30085; H04N 21/4627
USPC ........................................................ 707/662
See application file for complete search history.

(56) References Cited

U.S. PATENT DOCUMENTS

| | | | |
|---|---|---|---|
| 7,568,096 B2 | 7/2009 | Evans et al. | |
| 7,747,532 B2 | 6/2010 | Wakimoto | |
| 2003/0028454 A1 | 2/2003 | Ooho et al. | |
| 2005/0198510 A1* | 9/2005 | Robert et al. | 713/175 |
| 2006/0031222 A1* | 2/2006 | Hannsmann | 707/10 |

(Continued)

FOREIGN PATENT DOCUMENTS

| | | |
|---|---|---|
| CN | 101453324 A | 6/2009 |
| CN | 101523397 A | 9/2009 |
| CN | 101807238 A | 8/2010 |

OTHER PUBLICATIONS

"DomainAcquirer Class", Retrieved at << http://msdn.microsoft.com/en-us/library/system.windows.media.domainacquirer(VS.95).aspx >>, Retrieved Date: Sep. 27, 2010, pp. 3.

(Continued)

*Primary Examiner* — James Trujillo
*Assistant Examiner* — Grace Park
(74) *Attorney, Agent, or Firm* — Dan Choi; Judy Yee; Micky Minhas (57) ABSTRACT

Content license storage is provided by holding, in a temporary license store on the content consumption device, a plurality of content licenses for a plurality of content streams, wherein each content license of the plurality of content licenses includes a removal date. The method further includes for each content license of the plurality of content licenses corresponding to a content stream of the plurality of content streams which is designated for archived playback, copying the content license into an embedded license store within the content stream to form an archived content stream. The method further includes removing one or more of the plurality of content licenses held at the temporary license store if the removal date included in the content license has been reached, while leaving each content license stored within an archived content stream even if the removal date has been reached.

17 Claims, 5 Drawing Sheets

(56) References Cited

U.S. PATENT DOCUMENTS

| | | |
|---|---|---|
| 2006/0242078 A1* | 10/2006 | Evans et al. .................. 705/59 |
| 2007/0033402 A1* | 2/2007 | Williams et al. ............. 713/169 |
| 2007/0050301 A1 | 3/2007 | Johnson |
| 2007/0073728 A1* | 3/2007 | Klein et al. ................... 707/10 |
| 2008/0010460 A1 | 1/2008 | Schuschan |
| 2008/0120666 A1* | 5/2008 | Guzman et al. .............. 725/110 |
| 2008/0222044 A1 | 9/2008 | Gottlieb et al. |
| 2008/0267398 A1 | 10/2008 | Peterka et al. |
| 2008/0301054 A1* | 12/2008 | Russell et al. ................ 705/59 |
| 2009/0271319 A1 | 10/2009 | Bromley et al. |
| 2010/0064378 A1 | 3/2010 | Hwang et al. |

OTHER PUBLICATIONS

"PlayReady," Wikipedia.com, http://en.wikipedia.org/wiki/PlayReady, Available as Early as Nov. 21, 2009, 2 pages.

"Ericsson Mediaroom," Wikipedia.com, http://en.wikipedia.org/wiki/Ericsson_Mediaroom, Available as Early as Dec. 30, 2009, 3 pages.

State Intellectual Property Office of the People's Republic of China, First Office Action and Search Report Issued in Chinese Patent Application No. 201110435595.X, Mar. 6, 2014, 15 pages.

State Intellectual Property Office of the People's Republic of China, Second Office Action and Search Report Issued in Chinese Patent Application No. 201110435595.X, Aug. 6, 2014, 18 pages.

* cited by examiner

CONTENT LICENSE STORAGE

BACKGROUND

Content streaming is becoming an increasingly common way for providing content to a client. In some cases, digital rights management (DRM) technologies such as encryption may be employed to control access to content. For the case of cryptographic encryption, the content may be cryptographically encrypted with a cryptographic key, and the encrypted content may then be streamed to the client. The client may then be provided with a license corresponding to the content permitting the client to consume the content (e.g., by providing the user with cryptographic key(s) for decrypting the encrypted content). Typically a content provider streams hundreds, if not thousands, of content streams, and a client subscribes to a particular subset of those content streams, and may even receive a license for each stream. As such, it may be challenging to efficiently manage license storage on the client side.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

According to one aspect of this disclosure, on a content consumption device, a method of content license storage is provided. The method includes holding, in a temporary license store on the content consumption device, a plurality of content licenses for a plurality of content streams, wherein each content license of the plurality of content licenses includes a removal date. The method further includes for each content license of the plurality of content licenses corresponding to a content stream of the plurality of content streams which is designated for archived playback, copying the content license into an embedded license store within the content stream to form an archived content stream. The method further includes removing one or more of the plurality of content licenses held at the temporary license store if the removal date included in the content license has been reached, while leaving each content license stored within an archived content stream even if the removal date has been reached.

DETAILED DESCRIPTION

A server may stream hundreds, if not thousands or more, of encrypted content streams which may be variously grouped into content subscriptions. If each encrypted content stream is cryptographically encrypted (hereinafter, encrypted) with a different cryptographic key (hereinafter, key), then a user may need several keys in order to have the capability to decrypt all content streams associated with their subscription. Since each set of keys may be provided (e.g., via cryptographic sharing) to the user's content consumption device within a license, it is desirable to have an efficient way for managing license storage at the user's content consumption device (e.g., at the client).

In particular, a content provider may not only provide several content streams, but may also support playback features such as instant channel change, content archiving (e.g., for time-shifted viewing of linear content), etc. As such, clients may not only receive keys for large numbers of channels, but some of these keys may correspond to channels the user does not watch or even archive. Thus, it is further desirable for the client to manage license storage such that the client retains keys for consuming current content streams and archived streams, yet discards keys that the client no longer needs.

Therefore, embodiments are disclosed herein that relate to content license storage wherein each content license includes a removal date. The content consumption device stores content licenses in a temporary license store, and may manage (e.g., organize, remove, etc.) the licenses based on the removal date. Further, when archiving content, the content consumption device may copy the content license into another store within the content stream to form an archived content stream. In this way, the archived content is "self contained" and has the license(s) needed for archived playback. As such, licenses stored within the embedded license store of the content are not subject to removal based on the removal date. It should be appreciated that archived playback as used herein includes playback of archived content (e.g., time-shifted playback of recorded content, playback of content stored in a temporary pause buffer, etc.) as well as current playback of content while the content is being recorded.

Figure 1:
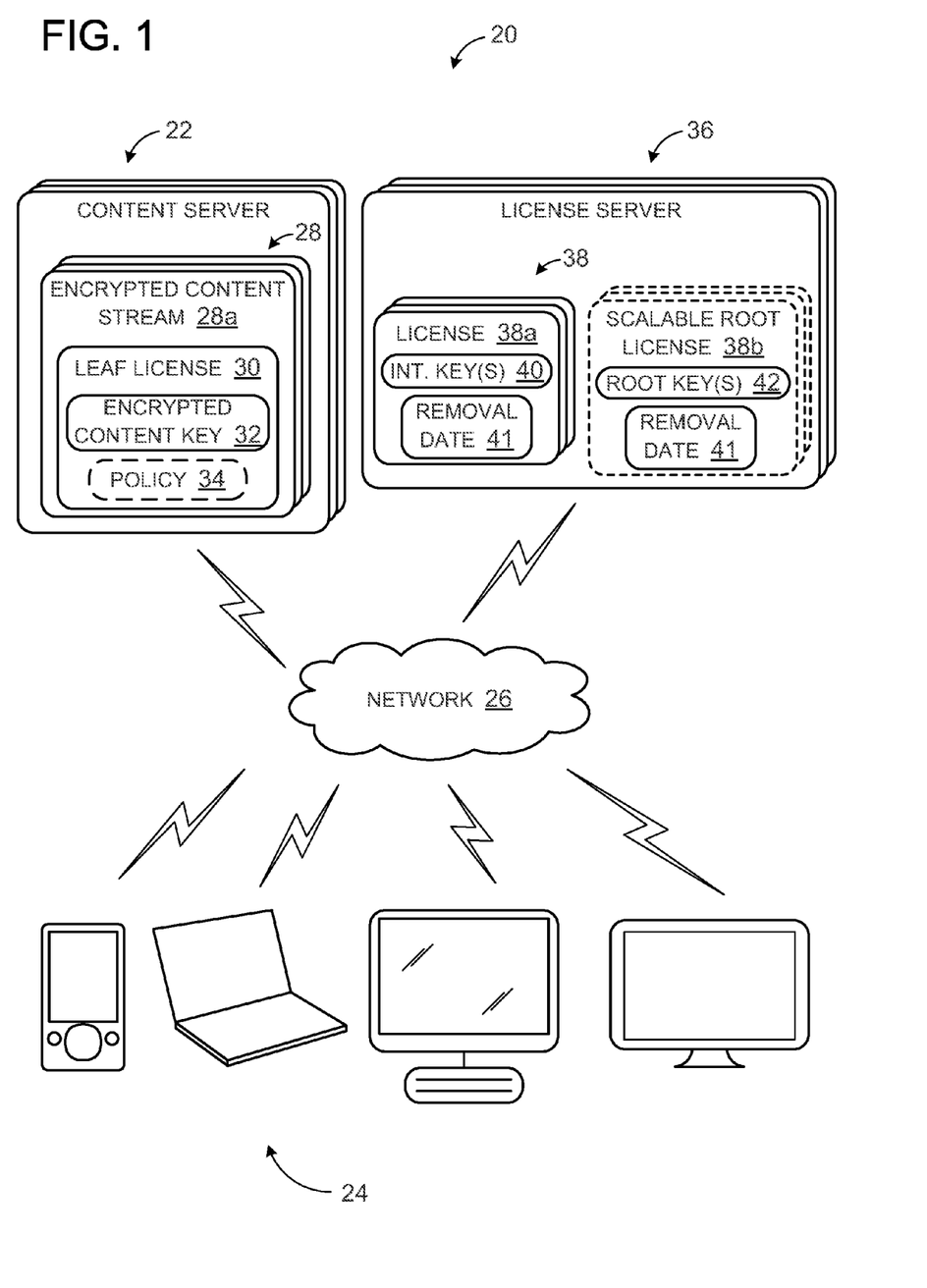
FIG. 1 shows a use environment in accordance with an embodiment of the present disclosure.

Turning now to FIG. 1, FIG. 1 illustrates an example content streaming environment 20 wherein a content server 22 is configured to stream content to one or more content consumption devices 24 via a network 26. It should be appreciated that content server 22 may include one or more server devices communicatively coupled with one another. Content consumption devices 21 may be any suitable devices configured to consume and archive streamed content, such as personal computers, media players, mobile devices, gaming systems, etc. Content consumption devices 24 may be configured to archive content to local storage in any suitable manner, such as by using digital video recording (DVR) techniques, for example.

Content server 22 may be configured to serve content via network 26 in any suitable manner. For example, the content may be live linear content served via multicast delivery over network 26, such as traditional Internet protocol television (IPTV) on a managed network. As another example, content server 22 may provide "over-the-top" delivery of content over network 26 (e.g., over the Internet). As yet another example, content server 22 may provide video on demand (VOD) over network 26. It should be appreciated that these examples are illustrative and not intended to be limiting in any manner.

Content server 22 may be configured to serve content by hosting multiple channels (e.g., IPTV channels, content services, etc.), wherein each channel includes one or more content streams. For example, a channel may include two content streams such as a video stream and a corresponding audio stream. However, in some cases, additional audio streams (e.g., language tracks, etc.) and/or additional video streams (e.g., high-definition video, alternative views, etc.) may be included.

Content server 22 may be configured to control access of one or more content consumption devices 24 to one or more of the content streams by serving content streams encrypted with one or more keys, depicted in FIG. 1 as encrypted content streams 28. As such, a content consumption device must have the proper key(s) in order to decrypt and consume an encrypted content stream. In this way, encrypting the content may mitigate unauthorized viewing.

As an example, FIG. 1 illustrates an example encrypted content stream 28*a* which is formed by encrypting a content stream with a content key. Each stream may be encrypted with a different content key. However, for the case of channels having more than one stream, each stream of the channel may optionally be encrypted with the same content key.

Whereas traditionally content keys may be encrypted and provided to content consumption devices 24 separate from the serving of encrypted content streams, content server 22 is configured to provide each encrypted content stream with its corresponding encrypted content key. The encrypted content key may be provided with the encrypted stream in any suitable manner. As an example, FIG. 1 shows example encrypted content stream 28*a* embedded with a leaf license 30. Leaf license 30 includes the encrypted content key 32 associated with encrypted content stream 28*a*. The embedded leaf license 30 may include additional information, such as a content policy 34 for the content stream, mitigations against tampering with the policy and/or the encrypted content key, etc. By serving content in this way, content server may advantageously utilize a same distribution method for distributing the content keys as utilized for distributing the content itself. Further, content server 22 may optionally provide real-time changes of content encryption and/or content policy by changing the encrypted content key and/or content policy at any suitable point within the stream.

By serving encrypted content streams each embedded with a leaf license including its corresponding encrypted content key, content server 22 may serve the same encrypted content streams 28 to all content consumption devices 24. Access is then controlled in that in order for a content consumption device to be able to decrypt and consume the content, the content consumption device must be capable of decrypting the encrypted content key in the leaf license before using the decrypted content key to decrypt the encrypted content stream. A content consumption device may be afforded such capabilities via a licensing process wherein the content consumption device subscribes to a particular subset of content streams (e.g., via a subscription), and in return, is provided with licenses having the appropriate keys for decrypting the encrypted content keys corresponding to the content to which they are subscribed.

Each content key encrypting a content stream may itself be encrypted in any suitable manner, such as by one or more other keys (e.g., intermediate encryption keys). In such a case, intermediate decryption keys paired to the intermediate encryption keys are provided to content consumption devices (e.g., via a license server) upon registration for a particular content subscription. Since intermediate decryption keys may be issued to the content consumption device based on a subscription, the content consumption device thus receives only the intermediate decryption keys to which it is entitled. In other words, if the content consumption device is not authorized to view certain content streams, they will not receive the intermediate decryption keys for decrypting content keys of those streams, and thus will not be capable of consuming those streams.

It should be appreciated that intermediate keypairs may be asymmetrical or symmetrical. In the latter case, an intermediate encryption key may be related to, or the same as, the intermediate decryption key to which it is paired.

Intermediate decryption keys may be provided to one or more content consumption devices 24 in any suitable manner. FIG. 1 illustrates an example scenario wherein a license server 36 is configured to serve licenses 38 via network 26. It should be appreciated that license server 36 may include one or more server devices communicatively coupled with one another. It should be further appreciated that network 26 is shown in FIG. 1 for illustrative purposes and is not intended to be limiting in any way. Thus, in some embodiments, content server 22 and license server 36 may serve content and licenses, respectively, over different networks. Further, in some embodiments, content server 22 and license server 36 may be the same device and/or may be communicatively coupled with one another.

The intermediate decryption keys may, for example, correspond to a channel, such that each channel is encrypted with a content key which is encrypted with an intermediate encryption key (e.g., a channel encryption key) paired to a corresponding intermediate decryption key (e.g., a channel decryption key).

In some embodiments, license server 36 may serve a license (e.g., a content license) such as example license 38*a* which includes one or more intermediate decryption keys 40 provided to a particular one of the content consumption devices 24. As such, the content consumption device may be served a content license for each content stream to which the content consumption device subscribes. It should be appreciated that content licenses may be issued to the content consumption device or to a domain to which the content consumption device belongs.

Further, each content license includes a removal date (e.g., removal date 41) indicating when (e.g., a date and time) the intermediate keys are no longer needed to view the content. For example, after the removal date, the content being streamed to the client may be bound to a new set of intermediate decryption keys (e.g., due to rotation of the intermediate decryption keys) and therefore the client no longer needs to keep these intermediate decryption keys. It should be appreciated that the removal date may be somewhat later than the actual date and time that the content system changes intermediate key sets, to account for clock skew, etc. As a nonlimiting example, if an intermediate key set is valid for the next eight hours, the license might contain a removal date ten hours in the future. The removal date may be provided via metadata with the license, for example.

When the client receives the license or licenses containing its intermediate decryption keys, it stores the license(s) in a store that recognizes the removal date (e.g., a temporary license store). Thus, upon reaching their removal date, licenses are removed from the temporary license store at the content consumption device. However, when archiving streams for archived playback, the content consumption device is configured to save the content license within an embedded license store within the stream thus forming an archived content stream. Licenses in an embedded license store are not removed when their removal date is reached, as described in more detail with reference to FIG. 2. It should be appreciated that the content license may additionally or alternatively be saved in another suitable permanent license store other than the embedded license store without departing from the scope of this disclosure. As such, it will be appreciated that disclosure herein generally relating to the embedded license store may be equally applied to other types of permanent license stores.

It should be appreciated that the content consumption device may request its intermediate decryption keys based on any suitable criteria. For example, in sonic embodiments, the client may periodically send a request for its intermediate decryption keys (e.g., every eight hours), and in response, receive an updated license with an updated set of intermediate decryption keys. As another example, the client may be triggered (e.g., by an application, etc.) to request its intermediate decryption keys. As yet another example, a content consumption device may request its intermediate decryption keys at start-up, or before a useful period of the existing intermediate decryption keys expires, for example.

Further, it should be appreciated that in some embodiments, license server 36 may be configured to instead serve a license such as a scalable root license 38b which includes intermediate root keys 42 from which the content consumption device may derive intermediate decryption keys 40. As such, license server 36 may reduce the amount of keys it serves, and thus reduce its computational, bandwidth, and/or storage expense. The content consumption device is then configured with the capability for deriving their intermediate decryption keys from their root intermediate keys of their scalable root license.

Further yet, it should be appreciated that the license server may be configured to securely serve intermediate decryption keys via cryptographic sharing, such that unwanted content consumption devices and/or audiences cannot use such keys. In cryptographic sharing, the license server may bind the intermediate keys to the client's asymmetric keypair. As an example, the client may provide a client certificate to the license server which includes the client's public key (e.g., a device public key, a domain public key, etc.). The license server may then bind the license to the public key, either directly, or indirectly via another key.

Figure 2:
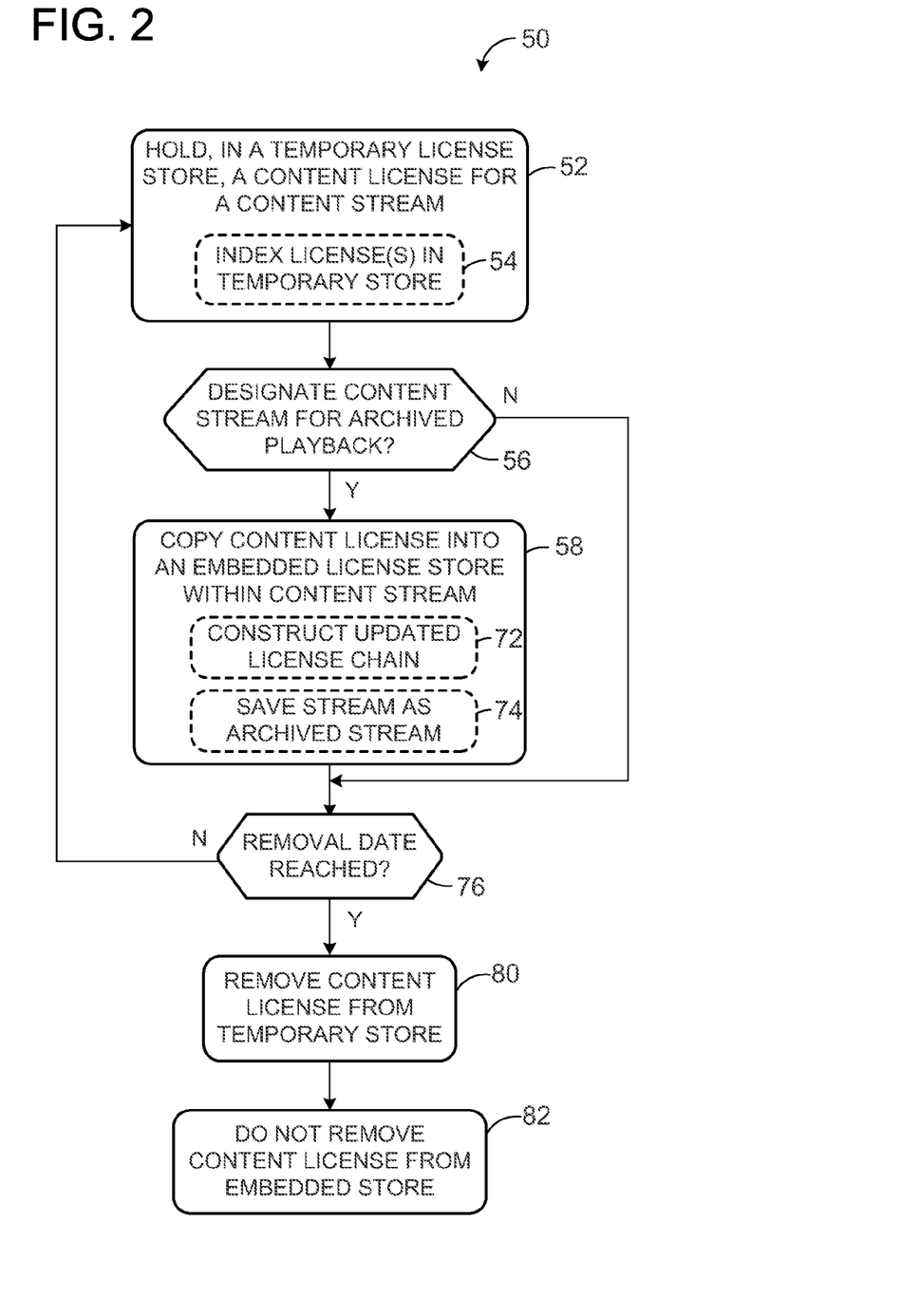
FIG. 2 shows a flow diagram for an example method of content license storage.

FIG. 2 shows a flow diagram for an example method 50 of content license storage on a content consumption device (e.g., any of content consumption devices 24 of FIG. 1). At 52, a content license for a content stream is held in a temporary license store at the content consumption device. The content license has a removal date indicating when the license is to be removed from the temporary license store. It should be appreciated that such a content license may be one of a plurality of content licenses held in the temporary license store for a plurality of content streams, each license having a removal date.

In some embodiments, method 50 may optionally include indexing the licenses held in the temporary store, as indicated at 54. Such indexing may be done in any suitable manner to facilitate efficient storage and/or retrieval of the licenses. For example, the content consumption device may be configured to index the licenses based on the retrieval dates. In this way, the content consumption device can easily identify licenses for removal.

At 56, it is determined whether or not the content stream associated with the license has been designated for archived playback. Such a designation may be responsive to a user selecting to archive the content stream for subsequent viewing (e.g., recording for time-shifted viewing, playback modes, etc.).

If the content stream is designated for archived playback, then method 50 proceeds to 58 where the content license is copied into an embedded license store within the content stream to form an archived content stream. The license may be copied into any suitable portion of the archived content stream, such as the header or a container wrapper, for example. In some embodiments, the license may be saved in a separate file, such as a file attached to or otherwise corresponding to the content stream.

Figure 3:
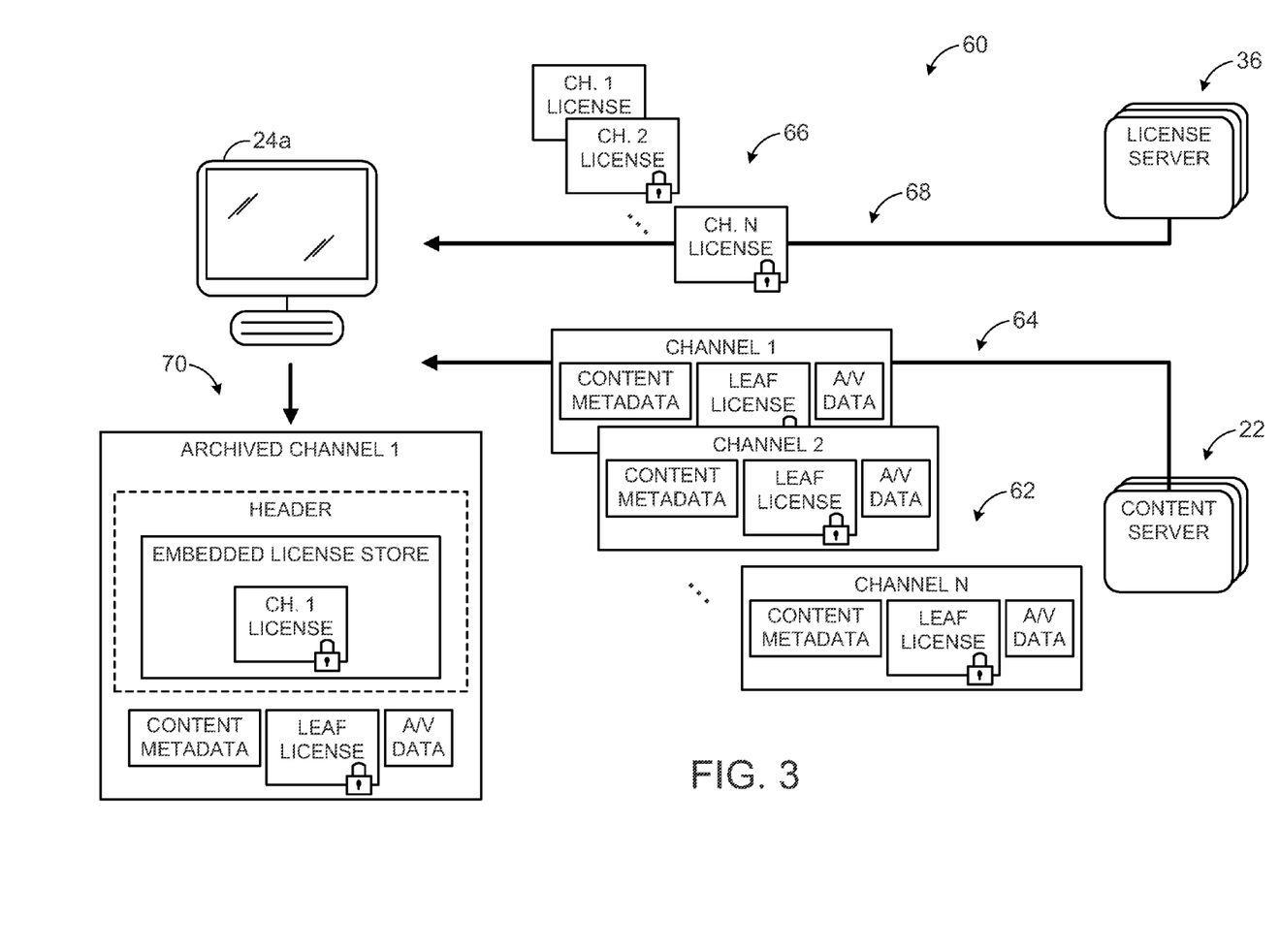
FIG. 3 shows an example use scenario in accordance with an embodiment of the present disclosure.

FIG. 3 shows an example use scenario 60, wherein an example content consumption device 24a receives content streams 62 from content server 22 as indicated at 64, and receives corresponding content licenses 66 from license server 36 as indicated at 68. In this example, the content stream "Channel 1" is designated for archived playback. Content consume device 24a stores content license "Ch. 1 license" within an archived content stream "Archived Channel 1," as indicated at 70. As introduced above, content consumption device 24a may optionally store the content license within a header of "Archived Channel 1." However, it should be appreciated that this example is illustrative, and content consumption device 24a may instead store such a license elsewhere within the archived stream.

Returning to FIG. 2, in some embodiments, copying the content license into the embedded license store may include constructing an updated license chain, as indicated at 72. For example, the content stream may include an embedded license chain comprising one or more licenses. Such license (s) may include, but are not limited to, a leaf license, intermediate license(s) for a channel corresponding to the content stream, a root license identifying a content subscription associated with the content stream, etc. In such a case, the content consumption device may construct an updated license chain which includes one or more licenses in the chain which are identified as being utilized during archived playback. The content stream may then be saved with the updated license chain as an archived content stream, as indicated at 74. In some embodiments, the license chain may be saved in a header of the archived content stream.

By copying a content license into the content stream to form an archived content stream, the archived content stream is essentially "self contained" for subsequent archived playback, in that the archived content stream includes all the license(s) needed for playback. Further, such an approach may be particularly advantageous with respect to content and license management. For example, backing up archived content streams ensures backup of the associated licenses since the licenses are stored within the archived content streams. Likewise, organization and/or deletion of archived content ensures the licenses are thus organized and/or deleted accordingly.

Method 50 next proceeds from 58 to 76. Further, if at 56 it was determined that the content stream is not designated for archived playback, method 50 also proceeds to 76.

At 76, it is determined whether or not the removal date of the content stream has been reached. If the removal date has not been reached, method 50 returns to 52.

Method 50 next proceeds to 80, wherein if the removal date has been reached and the content stream is not designated for playback, the content license is removed from the temporary license store at the content consumption device.

Method 50 next proceeds to 82, wherein if the removal date has been reached and the content stream is designated for archived playback, the content license is not removed from the embedded license store within the archived content stream, as indicated at 82. As such, archived content streams retain their licenses, and can therefore utilize these licenses during archived playback.

In the event that a copy of the license still exists in the temporary license store on the content consumption device, then method 50 may optionally proceed to 80 where the license is removed from the temporary license store.

In this way, licenses in the temporary store are removed when their removal date is reached but those in the embedded license store within the content itself have the same lifetime as the content. Further, if the content consumption device subsequently deletes the archived content, then such an operation may automatically delete all the associated licenses.

It should be appreciated that content consumption devices supporting archiving (e.g., DVR) functionality may further support a local pause buffer which allows users to rewind or pause a content stream for up to a predetermined period of time (e.g., 30 minutes). It should be appreciated that this is also a form of archiving, and therefore the content consumption device is configured to retain license(s) for content in the local pause buffer in case the local pause buffer is converted to a regular recording or the user wants to watch content within the buffer. This prevents the license(s) from being removed when their removal date reached. Such an example also further illustrates why it may be advantageous to have the removal date somewhat longer than the rotation period for the keys (e.g., longer than the sum of the rotation period plus the length of the pause buffer).

Further, it should be appreciated that in some embodiments, determining whether or not the removal date has been reached (e.g., at 76) may be responsive to a trigger condition. Such a trigger condition may be any suitable condition, such as the running of a script/thread which performs a query of the removal dates of licenses in the temporary license store. As other examples, examination of removal dates may be responsive to other trigger conditions such as a start-up condition, after is predetermined duration of time has passed, etc.

Moreover, in some embodiments, licenses may further include an expiration date which is different than the removal date. The expiration date may be associated with license policy, such that when the expiration date has been reached, playback of content is in violation of the compliance rules. As such, licenses having expiration dates may be removed or otherwise disabled regardless of where they are stored (e.g., temporary license store, embedded license store, etc.).

Accordingly, it should be appreciated that a content license stored within an archived content stream is configured to comply with license expiration policy separately from license removal policy. In other words, even when the removal date of a license is reached, the client is still compliant with license expiration policy if the expiration date has not been reached.

Figure 4:
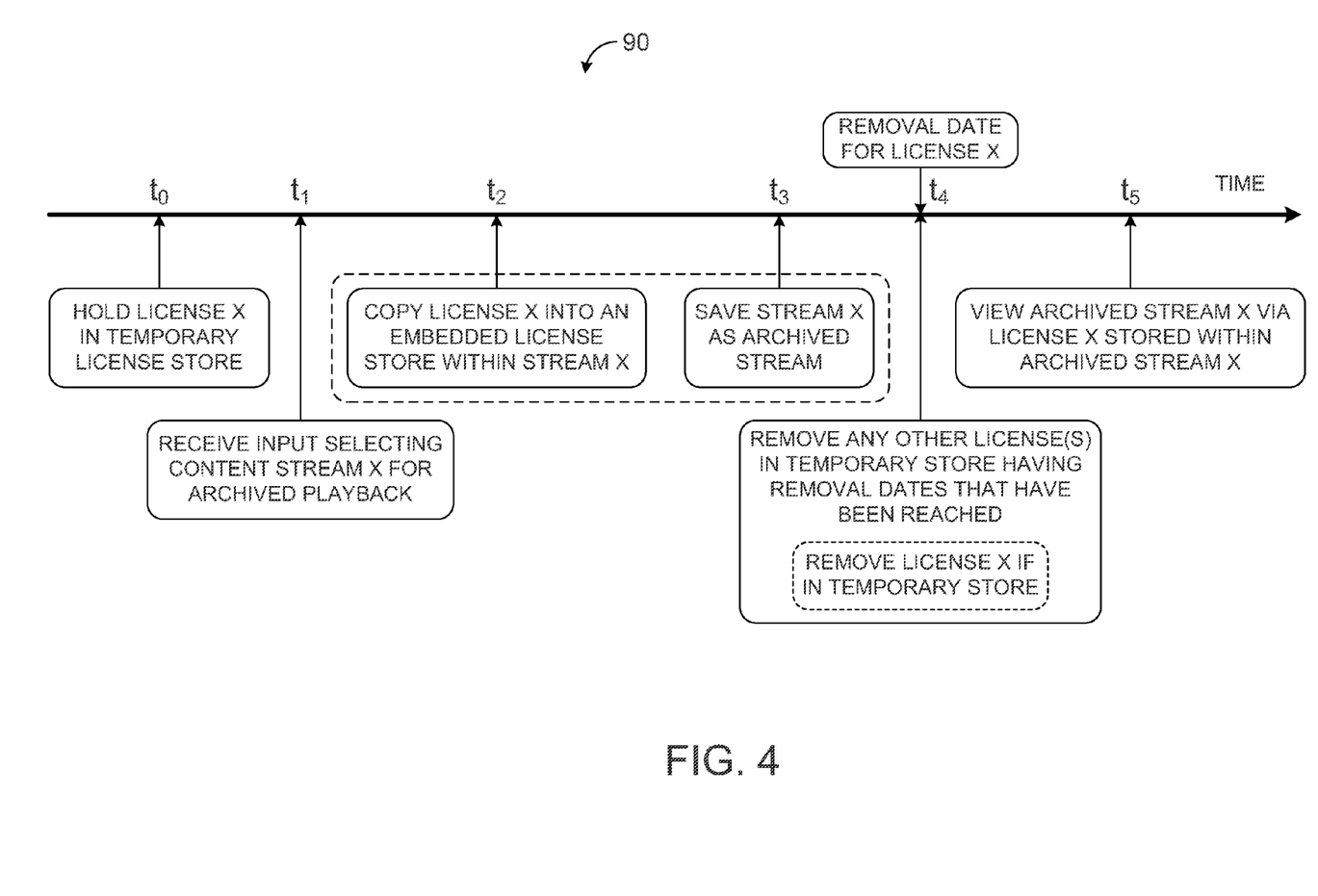
FIG. 4 shows a timeline of another example use scenario in accordance with an embodiment of the present disclosure.

FIG. 4 illustrates a timeline 90 of a possible use scenario. At time $t_0$, the content consumption device holds a license (e.g., License X) in a temporary license store on the content consumption device. It should be appreciated that License X may be one of multiple licenses held in the temporary license store.

At time $t_1$, the content consumption device receives an input selecting the content stream associated with License X (e.g., Content Stream X) for archived playback.

Then, at time $t_2$, the content consumption device copies License X into an embedded license store within Content Stream X, thus forming an Archived Content Stream X as indicated at time $t_3$. As described above, in the case that the content stream includes a license chain with multiple licenses, the content consumption device may determine which intermediate key(s) it needs for the embedded leaf license(s) within the content stream for subsequent playback. For example, whenever a new intermediate key is identified as being utilized for accessing (e.g., decrypting) the content key within an embedded leaf license, the client may add the license or licenses containing the intermediate key to the embedded license store (e.g., in the content header) within the archived content stream.

It should be appreciated that there are potentially many keys involved here since the content key used to decrypt the content can change at any point and/or the content key may be bound to multiple intermediate keys. Further, the intermediate key set used to access the content keys may change in the middle of an archived content stream, and thus the licenses including all keys utilized for accessing the content are to be stored within the stream. Further, in some embodiments, the client may update the content header in place within the archived file. However, in other embodiments, the client may keep a temporary file header so that it is easier to make license updates to the embedded license store in the separate copy, and then update the header in the content recording as part of finalizing the archived content stream.

It should be appreciated that such forming of the archived content stream may in some embodiments be substantially concurrent with copying the license(s) into the stream, etc. In other words, copying the license(s) and saving the archived stream may all be included within an archiving process.

Next, time $t_4$ indicates the removal date for License X. At this time, any licenses in the temporary license store having removal dates that have been reached may be removed, while leaving the copy of License X stored within Archived Content Stream X even though its removal date has been reached. However, in the case that a copy of License X still resides in the temporary license store, such a copy may be deleted.

At time $t_5$, Archived Content Stream X is viewed. Such viewing may be responsive to user selection for playback of the archived content, for example. The content consumption device then obtains the license from within the archived content stream (e.g., from within the license chain, from within the header, etc.) and consumes the archived content stream. Such consumption may include decrypting the encrypted content key with the intermediate key(s) included within the content license stored within the archived content stream to obtain the decrypted content key, and then using the decrypted content key to decrypt the encrypted content stream. As such, Archived Content Stream X is consumed even though the removal date of License X has been reached.

In some embodiments, the above described methods and processes may be tied to a computing system including one or more computers. In particular, the methods and processes described herein may be implemented as a computer application, computer service, computer API, computer library, and/or other computer program product.

Figure 5:
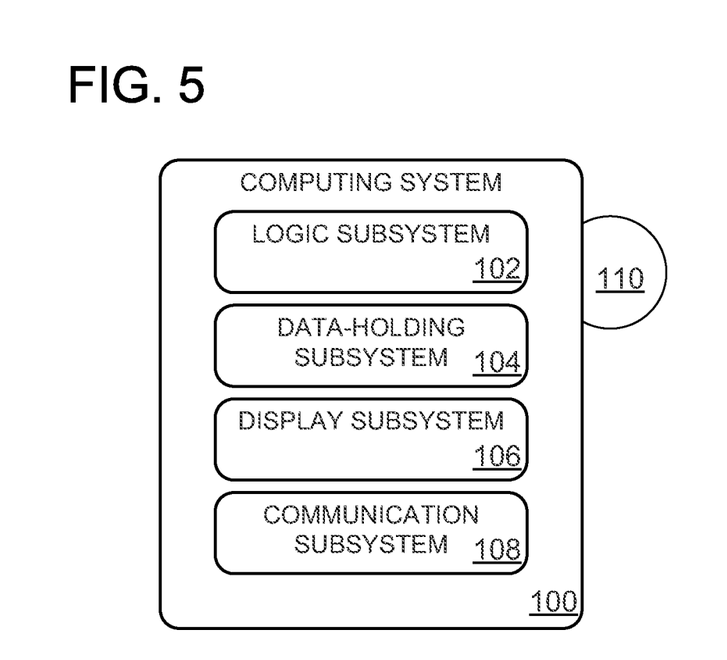
FIG. 5 shows an example computing system in accordance with an embodiment of the present disclosure.

FIG. 5 schematically shows a nonlimiting computing system 100 that may perform one or more of the above described methods and processes. Computing system 100 is shown in simplified form, and may represent any of content consumption devices 24, for example. It is to be understood that virtually any computer architecture may be used without departing from the scope of this disclosure. In different embodiments, computing system 100 may take the form of a mainframe computer, server computer, desktop computer, laptop computer, tablet computer, home entertainment computer, network computing device, mobile computing device, mobile communication device, gaming device, etc.

Computing system 100 includes a logic subsystem 102 and a data-holding subsystem 104. Computing system 100 may optionally include a display subsystem 106, communication subsystem 108, and/or other components not shown in FIG. 5. Computing system 100 may also optionally include user input devices such as keyboards, mice, game controllers, cameras, microphones, and/or touch screens, for example.

Logic subsystem 102 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Data-holding subsystem 104 may include one or more physical, non-transitory, devices configured to hold data and/or instructions executable by the logic subsystem to implement the herein described methods and processes. When such methods and processes are implemented, the state of data-holding subsystem 104 may be transformed (e.g., to hold different data).

Data-holding subsystem 104 may include removable media and/or built-in devices. Data-holding subsystem 104 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 104 may include devices with one or more of the following characteristics: volatile, nonvolatile, dynamic, static, read/write, read-only, random access, sequential access, location addressable, file addressable, and content addressable. In some embodiments, logic subsystem 102 and data-holding subsystem 104 may be integrated into one or more common devices, such as an application specific integrated circuit or a system on a chip.

FIG. 5 also shows an aspect of the data-holding subsystem in the form of removable computer-readable storage media 110, which may be used to store and/or transfer data and/or instructions executable to implement the herein described methods and processes. Removable computer-readable storage media 110 may take the form of CDs, DVDs, HD-DVDs, Blu-Ray Discs, EEPROMs, and/or floppy disks, among others.

It is to be appreciated that data-holding subsystem 104 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

The terms "module," "program," and "engine" may be used to describe an aspect of computing system 100 that is implemented to perform one or more particular functions. In some cases, such a module, program, or engine may be instantiated via logic subsystem 102 executing instructions held by data-holding subsystem 104. It is to be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" are meant to encompass individual or groups of executable files, data files, libraries, drivers, scripts, database records, etc.

It is to be appreciated that a "service", as used herein, may be an application program executable across multiple user sessions and available to one or more system components, programs, and/or other services. In some implementations, a service may run on a server responsive to a request from a client.

When included, display subsystem 106 may be used to present a visual representation of data held by data-holding subsystem 104. As the herein described methods and processes change the data held by the data-holding subsystem, and thus transform the state of the data-holding subsystem, the state of display subsystem 106 may likewise be transformed to visually represent changes in the underlying data. Display subsystem 106 may include one or more display devices utilizing virtually any type of technology. Such display devices may be combined with logic subsystem 102 and/or data-holding subsystem 104 in a shared enclosure, or such display devices may be peripheral display devices.

When included, communication subsystem 108 may be configured to communicatively couple computing system 100 with one or more other computing devices. Communication subsystem 108 may include wired and/or wireless communication devices compatible with one or more different communication protocols. As nonlimiting examples, the communication subsystem may be configured for communication via a wireless telephone network, a wireless local area network, a wired local area network, a wireless wide area network, a wired wide area network, etc. In some embodiments, the communication subsystem may allow computing system 100 to send and/or receive messages to and/or from other devices via a network such as the Internet.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. On a content consumption device, a method of content license storage, the method comprising:
holding, in a temporary license store on the content consumption device, a plurality of content licenses for a plurality of content streams, each content license of the plurality of content licenses including a removal date;
determining if a content stream is designated for archived playback;
for each content license of the plurality of content licenses corresponding to only the content stream of the plurality of content streams which is designated for archived playback, copying that content license from the temporary license store into an embedded license store within the content stream to form an archived content stream, while maintaining that content license in the temporary license store;

removing one or more content licenses corresponding to the content stream designated for archived playback held at the temporary license store if the removal date included in the one or more content licenses has been reached, while leaving each content license stored within the archived content stream for as long as the archived content is designated for archived playback and even if the removal date has been reached;

receiving a playback request to play an archived content stream that includes a copied content license within an embedded license store of that archived content stream; and presenting the archived content stream even if a removal date included in the copied content license for the archived content stream has been reached.

2. The method of claim 1, wherein the embedded license store is within a header of the archived content stream.

3. The method of claim 1, further comprising indexing the plurality of content licenses in the temporary license store based on the removal date of each of the plurality of content licenses.

4. The method of claim 1, wherein removing one or more of the plurality of content licenses held at the temporary license store if the removal date included in the content license has been reached is responsive to a trigger condition.

5. The method of claim 1, wherein a content license stored within the archived content stream is configured to comply with license expiration policy separately from license removal policy.

6. The method of claim 1, wherein one or more of the plurality of content licenses is a domain content license issued to a domain to which the content consumption device belongs.

7. The method of claim 1, wherein each of the plurality of content licenses is embedded within a corresponding encrypted content stream and includes an encrypted content key paired to a content key cryptographically encrypting the encrypted content stream, the encrypted content key cryptographically decryptable by the content consumption device via one or more intermediate keys provided to the content consumption device via cryptographic sharing.

8. On a content consumption device, a method of digital video recording, the method comprising:
holding, in a temporary license store on the content consumption device, a content stream including an embedded license chain comprising one or more licenses;
constructing an updated license chain comprising one or more licenses identified for utilization during archived playback of the content stream, while maintaining the embedded license chain in the temporary license store;
saving the content stream with the updated license chain as an archived content stream;
removing the embedded license chain from the temporary license store if a removal date of a content license in the embedded license chain has been reached, while leaving the updated license chain saved in the archived content stream for as long as the archived content stream is designated for archived playback and even if the removal date of a content license of the updated license chain has been reached;
receiving a playback request to play the archived content stream; and
presenting the archived content stream even if the removal date associated with the one or more licenses of the updated license chain has been reached.

9. The method of claim 8, wherein saving the content stream comprises saving the updated license chain in a header of the archived content stream.

10. The method of claim 8, further comprising determining that the removal date of one or more licenses of the updated license chain has been reached, and not removing the one or more licenses from the archived content stream.

11. The method of claim 8, wherein the embedded license chain comprises a leaf license embedded into an encrypted content stream, the leaf license including an encrypted content key paired to a content key cryptographically encrypting the encrypted content key, the encrypted content key cryptographically decryptable by the content consumption device via one or more intermediate keys provided to the content consumption device via cryptographic sharing.

12. The method of claim 8, wherein the embedded license chain comprises one or more intermediate licenses for a channel corresponding to the content stream.

13. The method of claim 8, wherein the embedded license chain comprises a root license identifying a content subscription associated with the content stream.

14. A data-holding device configured to hold instructions executable by a logic machine to:
hold, in a temporary license store on a content consumption device, a plurality of content licenses for a plurality of content streams, each content license of the plurality of content licenses including a removal date;
determine if a content stream is designated for archived playback;
for each content license of the plurality of content licenses corresponding to only the content stream of the plurality of content streams which is designated for archived playback, copy that content license from the temporary license store into an embedded license store within the content stream to form an archived content stream, while maintaining that content license in the temporary license store;
remove one or more content licenses corresponding to the content stream designated for archived playback held at the temporary license store if the removal date included in the one or more content licenses has been reached, while leaving each content license stored within the archived content stream for as long as the archived content stream is designated for archived playback and even if the removal date has been reached;
receive a playback request to play an archived content stream that includes a copied content license within an embedded license store of that archived content stream; and
present the archived content stream even if a removal date included in the copied content license for the archived content stream has been reached.

15. The data-holding device of claim 14, wherein the embedded license store is within a header of the archived content stream.

16. The data-holding device of claim 14, wherein the instructions are further executable to index the plurality of content licenses in the temporary license store based on the removal date of each of the plurality of content licenses.

17. The data-holding device of claim 14, wherein the instructions are executable to, responsive to a trigger condition, remove one or more of the plurality of content licenses held at the temporary license store if the removal date included in the content license has been reached.

* * * * *